US012650868B2

(12) United States Patent
　　Tsirkin et al.

(10) Patent No.: US 12,650,868 B2
(45) Date of Patent: Jun. 9, 2026

(54) RUNNING VIRTUAL MACHINES WITHIN CONTAINERS

(71) Applicant: Red Hat, Inc., Raleigh, NC (US)

(72) Inventors: Michael Tsirkin, Ra'anana (IL); Amnon Ilan, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 932 days.

(21) Appl. No.: 17/444,374

(22) Filed: Aug. 3, 2021

(65) Prior Publication Data

US 2023/0041845 A1　　Feb. 9, 2023

(51) Int. Cl.
　　*G06F 9/455*　　　　(2018.01)
　　*G06F 9/50*　　　　(2006.01)
(52) U.S. Cl.
　　CPC ........ *G06F 9/45558* (2013.01); *G06F 9/5077* (2013.01); *G06F 2009/45562* (2013.01); *G06F 2009/45595* (2013.01)
(58) Field of Classification Search
　　CPC .............. G06F 9/45558; G06F 9/5077; G06F 2009/45562; G06F 2009/45595; G06F 2009/45566
　　See application file for complete search history.

(56) References Cited

U.S. PATENT DOCUMENTS

| | | | |
|---|---|---|---|
| 8,327,353 B2 | 12/2012 | Traut | |
| 8,490,090 B2 | 7/2013 | Ben-Yehuda et al. | |
| 8,819,647 B2 | 8/2014 | Mitran | |
| 8,874,749 B1 * | 10/2014 | Vittal | .................. H04L 67/1001 709/226 |
| 9,122,509 B2 | 9/2015 | Karve | |
| 9,176,767 B2 | 11/2015 | Cantu | |
| 9,766,915 B1 * | 9/2017 | Emelyanov | ............. G06F 9/455 |
| 10,324,863 B2 | 6/2019 | Lemay | |
| 10,365,948 B1 * | 7/2019 | Emelyanov | ......... G06F 9/45558 |

(Continued)

FOREIGN PATENT DOCUMENTS

CN　　　　108920255　　　　11/2018

OTHER PUBLICATIONS

Ben-Yehuda, Muli et al., "The Turtles Project: Design and Implementation of Nested Virtualization",9th USENIX Symposium on Operating Systems Design and Implemenation, Oct. 4-6, 2010, Vancouver, BC, Canada, http://www.usenix.org/events/osdi10/tech/full_papers/Ben-yehuda.pdf, pp. 1-14.

(Continued)

*Primary Examiner* — Aimee Li
*Assistant Examiner* — Hsing Chun Lin
(74) *Attorney, Agent, or Firm* — Womble Bond Dickinson (US) LLP

(57)　　　　ABSTRACT

System and method for running virtual machines within containers. An example method may include: running, by a host computer system, a hypervisor managing a first virtual machine implemented by a first container with a first set of resources, creating, by the hypervisor, a second container implementing the second virtual machine, wherein the second container is nested within the first container, determining, by the first virtual machine of the first container, one or more of the first set of resources to assign to the second container, and assigning, by the hypervisor, to the second container one or more of the first set of resources.

18 Claims, 6 Drawing Sheets

(56) References Cited

U.S. PATENT DOCUMENTS

| | | | |
|---|---|---|---|
| 10,437,627 B2 | 10/2019 | Hu | |
| 10,467,033 B2 | 11/2019 | Tian et al. | |
| 10,831,532 B2 | 11/2020 | Castet | |
| 2012/0131574 A1* | 5/2012 | Day, II | G06F 9/45558 718/1 |
| 2015/0268865 A1* | 9/2015 | Masrani | G06F 3/0665 711/114 |
| 2015/0378762 A1 | 12/2015 | Saladi et al. | |
| 2016/0085568 A1 | 3/2016 | Dupre et al. | |
| 2017/0371693 A1* | 12/2017 | Corrie | G06F 16/188 |
| 2018/0181418 A1 | 6/2018 | Elangovan et al. | |
| 2018/0373561 A1 | 12/2018 | Nassi et al. | |
| 2019/0087223 A1 | 3/2019 | Bhandari et al. | |
| 2019/0108051 A1 | 4/2019 | Wang et al. | |
| 2019/0370048 A1 | 12/2019 | Neiger et al. | |
| 2020/0034173 A1* | 1/2020 | Rosenberg | H04L 41/5041 |
| 2020/0341790 A1 | 10/2020 | Tsirkin | |
| 2021/0232419 A1* | 7/2021 | Mueller | G06F 9/45558 |
| 2022/0308867 A1 | 9/2022 | Sondag et al. | |
| 2023/0353709 A1* | 11/2023 | Loudon | G06F 3/017 |

OTHER PUBLICATIONS

Lim, J.T et al., "Optimizing Nested Virtualization Performance Using Direct Virtual Hardware", ACM ISBN 978-1-4503-7102-5/20/03, https://doi.org/10.1145/337373376.3378467, Session 7A: Virtualized environments—Take the blue pill, ASPLOS'20, Mar. 16-20, 2020, Lausanne, Switzerland, pp. 557-574.

Temelkova, Katerina, "Nested Virtualization and PCI Passthrough with KVM and OpenNebula", https://storpool.com/blog/nested-virtualization-with-kvm-and-opennebula, Nov. 26, 2019, 17 pages.

Kauer, Bernhard et al., "Recursive Virtual Machines for Advanced Security Mechansims", http://di.fc.ul.pt/~bessani/publications/dcdv11-recursivevm.pdf, Universidade de lisboa faculdade de Ciencias LaSIGE, 6 pages.

Amaral, Marcelo et al., "Performance Evaluation of Microservices Architectures using Containers", https://core.ac.uk/download/pdf/81578653.pdf, Technical University of Catalonia (UPC Barcelona Supercomputing Center (BSC); IBM T. J. Watson Research Center, Yorktown Heights, NY, 2015 IEEE, 8 pages.

* cited by examiner

NESTED VIRTUALIZATION
SYSTEM
205

COMPUTER SYSTEM
200

300

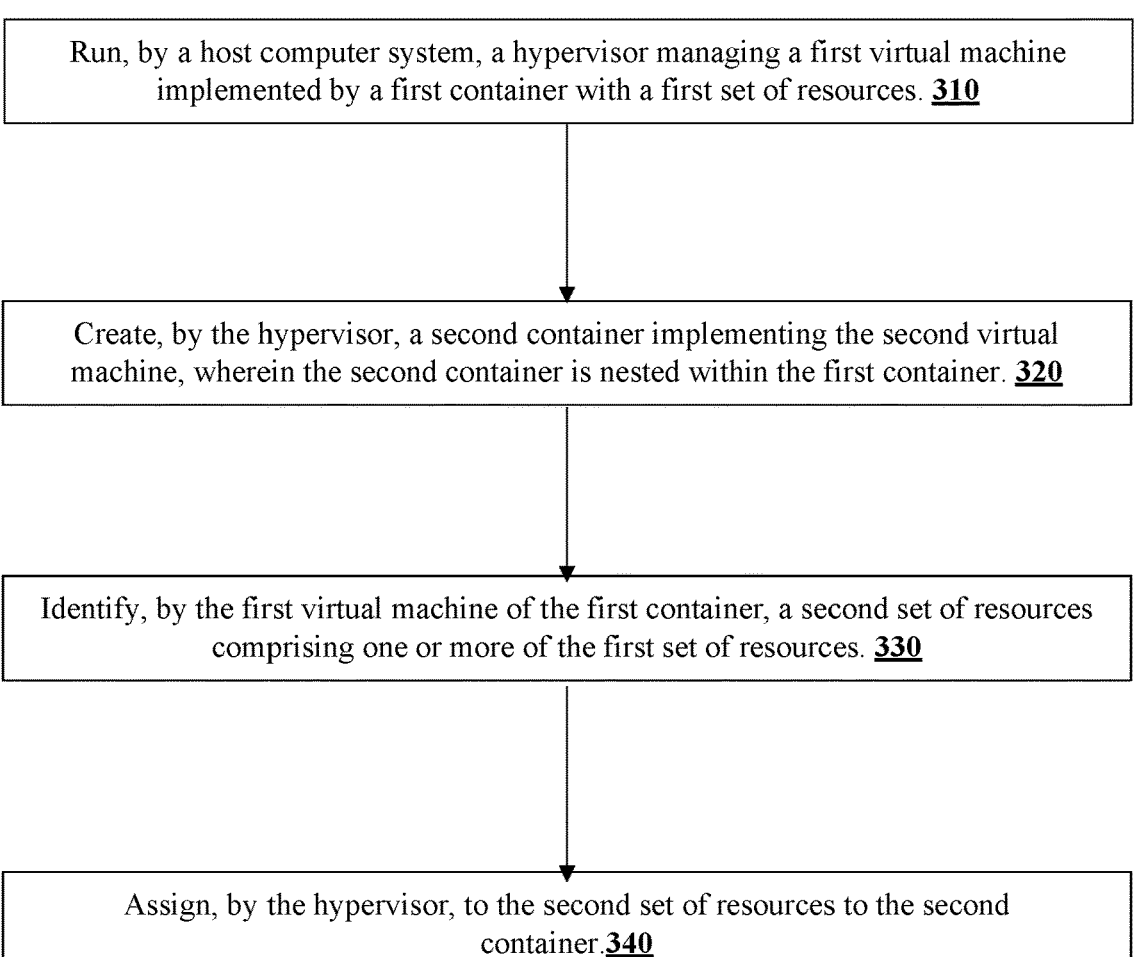

Run, by a host computer system, a hypervisor managing a first virtual machine implemented by a first container with a first set of resources. 310

Create, by the hypervisor, a second container implementing the second virtual machine, wherein the second container is nested within the first container. 320

Identify, by the first virtual machine of the first container, a second set of resources comprising one or more of the first set of resources. 330

Assign, by the hypervisor, to the second set of resources to the second container. 340

FIG. 3

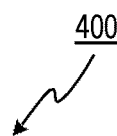
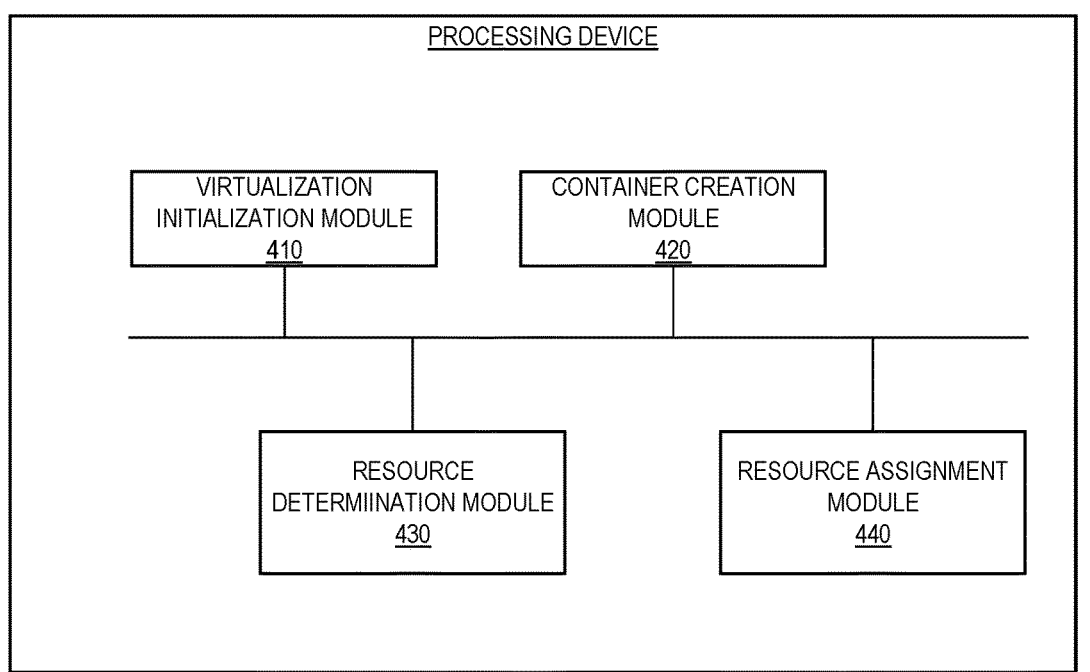
FIG. 4

500

| Run, by a host computer system, a hypervisor managing a first virtual machine implemented by a first container with a first set of resources. 510 |
| --- |

| Run, by the host computer system based on a request from the first virtual machine, a second virtual machine, managed by the first virtual machine, implemented by a second container with a second set of resources, wherein the second set of resources is a subset of the first set of resources. 520 |
| --- |

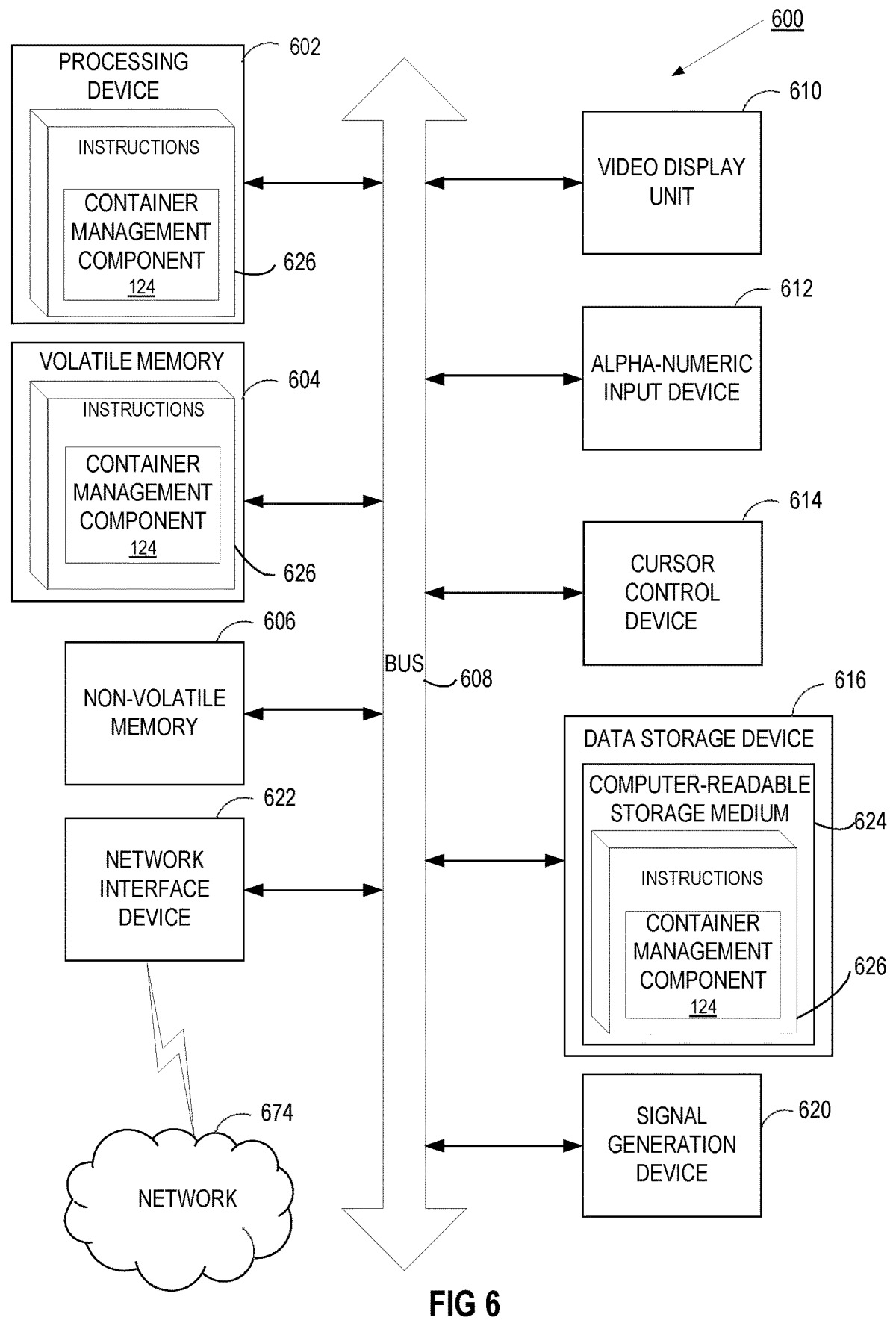

PROCESSING DEVICE — 602

INSTRUCTIONS

CONTAINER MANAGEMENT COMPONENT — 626
124

VOLATILE MEMORY — 604

INSTRUCTIONS

CONTAINER MANAGEMENT COMPONENT
124
— 626

NON-VOLATILE MEMORY — 606

NETWORK INTERFACE DEVICE — 622

NETWORK — 674

BUS — 608

VIDEO DISPLAY UNIT — 610

ALPHA-NUMERIC INPUT DEVICE — 612

CURSOR CONTROL DEVICE — 614

DATA STORAGE DEVICE — 616

COMPUTER-READABLE STORAGE MEDIUM — 624

INSTRUCTIONS

CONTAINER MANAGEMENT COMPONENT — 626
124

SIGNAL GENERATION DEVICE — 620

FIG 6

RUNNING VIRTUAL MACHINES WITHIN CONTAINERS

The present disclosure is generally related to virtualized computer systems, and more particularly, to running virtual machines within containers.

BACKGROUND

Virtualization herein shall refer to abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

Containerization is an operating-system-level virtualization environment for running multiple isolated system containers on a single host machine. It is an alternative to full machine virtualization that involves encapsulating a process into a container with its own operating environment. Some containerization technologies allow each container to run on the "bare metal" of a host machine while also being able to access a shared instance of a host operating system.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 3 depicts a flow diagram of an example method for running virtual machines within containers, in accordance with one or more aspects of the present disclosure;

FIG. 4 depicts a block diagram of an computer system in accordance with one or more aspects of the present disclosure;

FIG. 5 depicts a flow diagram of another example for running virtual machines within containers, in accordance with one or more aspects of the present disclosure; and FIG. 6 depicts a block diagram of an illustrative computing device operating in accordance with examples of the present disclosure.

DETAILED DESCRIPTION

Figure 1:
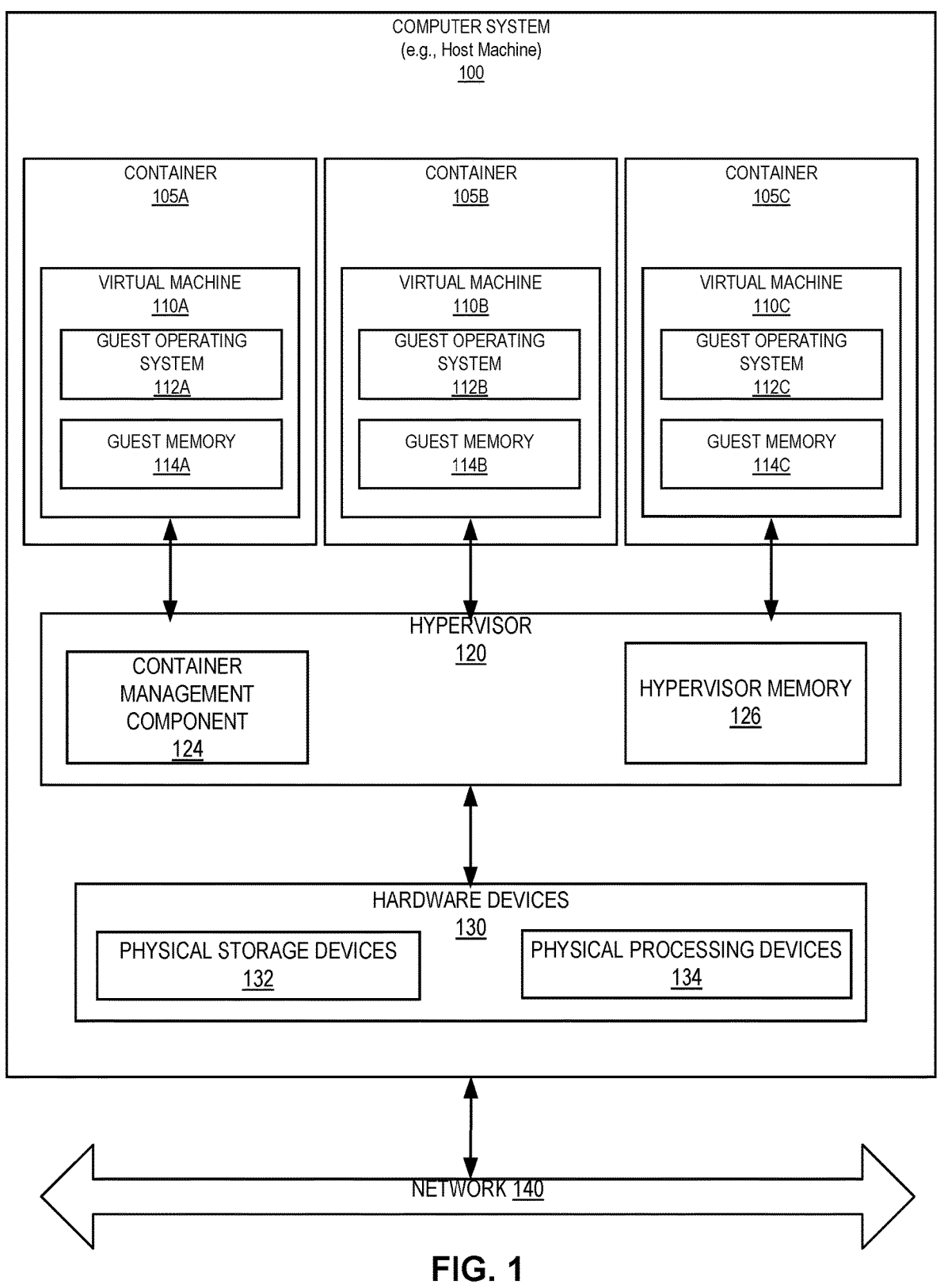
FIG. 1 depicts a high-level block diagram of an example host computer system that creates nested containers to run child virtual machines, in accordance with one or more aspects of the present disclosure.

Described herein are systems and methods for running virtual machines within containers. Certain processor architectures support virtualization by providing special instructions for facilitating virtual machine execution. In certain implementations, a processor may support executing a hypervisor (also referred to as "virtual machine monitor") that acts as a host and has full control of the processor and other platform hardware. A hypervisor presents a virtual machine with an abstraction of one or more virtual processors. A hypervisor is able to retain selective control of processor resources, physical memory, interrupt management, and input/output (I/O). Each virtual machine (VM) is a guest software environment that supports a stack consisting of operating system (OS) and application software. Each VM operates independently of other virtual machines and uses the same interface to the processors, memory, storage, graphics, and I/O provided by a physical platform. The software executing in a virtual machine is executed at the reduced privilege level so that the hypervisor can retain control of platform resources.

Nested virtualization refers to virtualization that runs inside an already virtualized environment. In nested virtualization, a hypervisor (hereafter "Level 0 hypervisor") controls physical hardware resources (e.g., bare metal). One or more first virtualized environments (hereafter "Level 1 VM") may run as virtual machine(s) managed by the Level 0 hypervisor. Each Level 1 VM may run its own set of VMs. These VMs can be referred to as Level 2 VMs. Each level indicates a ring of privilege and access to computing resources of a computer system, where Level 0 indicates a most privileged ring within an architecture of the computer system, and incremental levels indicate less privileged rings (e.g., Level 2 VM is less privileged that Level 1 VM). The Level 1 VM may control execution of the Level 2 VM(s).

Interrupts and exceptions are events that indicate that a condition exists in the system, the processor, or within the currently executing task that requires attention of a processor. The action taken by the processor in response to an interrupt or exception is referred to as servicing or handling the interrupt or exception. Interrupts occur at random times during the execution of a program, e.g., in response to signals from physical devices (e.g., requests to service peripheral devices). An interrupt may be addressed to any subset of processors within the system. In a computer system running one or more virtual machines, interrupts may be virtualized by the hypervisor identifying one or more virtual processors for servicing an outstanding interrupt and routing (or injecting) the interrupt message to the identified virtual processors (also referred to as virtual central processing units (vCPU)). Injectable interrupts include external interrupts, non-maskable interrupt (NMI), processor exceptions, software generated interrupts, system management interrupts, initialization interrupts, reset interrupts and software traps.

In nested virtualization, when an interrupt occurs at Level 0 hypervisor, Level 0 hypervisor injects the interrupt into Level 1 VM by sending the interrupt signal to a vCPU of the Level 1 VM requiring a virtual machine exit (VMExit) event from the receiving vCPU (e.g., the vCPU of Level 1 VM) and a virtual machine enter (VMEnter) event to the vCPU of Level 2 VM to inject the interrupt into each of the VMs of the Level 1 VM (e.g., Level 2 VMs). These processes uses additional processing resources (e.g., central processing unit (CPU) resources) and hinders performance.

Aspects of the present disclosure address the above-noted and other deficiencies by providing technology that improves performance of nested virtual machines by running virtual machines within nested containers. In particular, aspects of the present disclosure provide technology that allows a hypervisor to run a virtual a Level 1 VM within a Level 1 container. The technology further allows the hypervisor to create nested containers to execute the guest (Level 2 VM) virtual machine within the nested container. In an example, the host computer system can create a Level 2 container nested within the Level 1 container limiting the Level 2 container to at least a subset of resources of Level 1 container. Accordingly, the Level 2 VM runs in the Level 2 container with at least a subset of the resources of Level 1 container.

Various aspects of the above referenced methods and systems are described in details herein below by way of examples, rather than by way of limitation. The examples provided below discuss a virtualized computer system where managing nested containers may be initiated by aspects of a hypervisor, but a host operating system, a virtual machine, or a combination thereof. In other examples, the managing nested containers may be performed in a non-virtualized computer system that is absent a hypervisor or other virtualization features discussed below.

FIG. 1 depicts an illustrative architecture of elements of a computer system 100, in accordance with an embodiment of the present disclosure. It should be noted that other architectures for computer system 100 are possible, and that the implementation of a computing device utilizing embodiments of the disclosure are not necessarily limited to the specific architecture depicted. Computer system 100 (e.g., computing device) may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computing device 100 may be a computing device implemented with x86 hardware. In another example, computing device 100 may be a computing device implemented with PowerPC®, SPARC®, or other hardware. In the example shown in FIG. 1, computing device 100 may include containers 105A-C, virtual machines 110A-C, hypervisor 120, hardware devices 130, and a network 140.

The computing device 100 may provide operating system level virtualization by running a computer program that provides computing resources to one or more containers 105A-C. Operating system level virtualization may be implemented within the hypervisor 120 and may enable the existence of multiple isolated containers. In one example, operating system level virtualization may not require hardware support and may impose little to no overhead because programs within each of the containers may use the underlying hypervisor 120 to execute system calls. This may enable the computing device 100 to provide virtualization without the need to provide hardware emulation or be run in an intermediate virtual machine as may occur with hardware level virtualization. Operating system level virtualization may provide resource management features that isolate or limit the impact of one container (e.g., container 105A) on the resources of another container (e.g., container 105B or 105C).

The operating system level virtualization may provide a pool of computing resources that are accessible by container 105A and are isolated from one or more other containers (e.g., container 105B). The pool of resources may include filesystem resources (e.g., particular volumes), network resources (e.g., particular network interfaces, sockets, addresses, or ports), memory resources (e.g., particular memory portions), other computing resources, or a combination thereof. The operating system level virtualization may also limit (e.g., isolate) a container's access to one or more computing resources by monitoring the containers activity and restricting the activity in view of one or more limits. The limits may restrict the rate of the activity, the aggregate amount of the activity, or a combination thereof. The limits may include one or more of filesystem limits, disk limits, input/out (I/O) limits, memory limits, CPU limits, network limits, other limits, or a combination thereof.

Hypervisor 120 may include an operating system virtualizer that may provide containers 105A-C with access to computing resources. The operating system virtualizer may wrap one or more processes (e.g., of a particular service) in a complete filesystem that contains the code, runtime, system tools, system libraries, and other data present on the node that can be used by the processes executing within the container. In one example, the operating system virtualizer may be the same or similar to Docker® for Linux® or Windows®, ThinApp® by VMWare®, Solaris Zones® by Oracle®, other program, or a combination thereof that automates the packaging, deployment, and execution of applications inside containers.

Each of the containers 105A-C may refer to a resource-constrained execution environment implemented by computing device 100. Each of containers 105A-C may appear to a user as a standalone instance of the user space of an operating system (not shown) of the computing device 100. Each of the containers 105A-C may share the same kernel of a host operating system but may be constrained to use only a defined set of computing resources (e.g., CPU, memory, I/O). As will be described in greater detail below, each container 105A-C may run one or more virtual machines 110A-C. In some embodiments, one or more containers can be created to host a framework or provide other functionality of a service (e.g., web application functionality, database functionality) and may therefore be referred to as "service containers" or "application containers."

Virtual machines 110A-C may execute guest executable code that uses an underlying emulation of the physical resources. The guest executable code may include a guest operating system, guest applications, guest device drivers, etc. Each of the virtual machines 110A-C may support hardware emulation, full virtualization, para-virtualization, operating system-level virtualization, or a combination thereof. Virtual machines 110A-C may have the same or different types of guest operating systems, such as Microsoft®, Windows®, Linux®, Solaris®, etc. Virtual machines 110A-C may execute guest operating systems 112A-C that manage guest memory 114A-C.

Guest memory 114A-C may be any virtual memory, logical memory, physical memory, other portion of memory, or a combination thereof for storing, organizing, or accessing data. Guest memory 114A-C may represent the portion of memory that is designated by hypervisors 120 for use by one or more respective virtual machines 110A-C. Guest memory 114A-C may be managed by guest operating system 112A-C. Hypervisor memory 126 (e.g., host memory) may be the same or similar to the guest memory but may be managed by hypervisor 120 instead of a guest operating system. The memory allocated to guests may be a portion of hypervisor memory 126 that has been allocated by hypervisor 120 to virtual machines 110A-C and corresponds to guest memory of virtual machine 114A-C. Other portions of hypervisor memory may be allocated for use by hypervisor 120, a host operating system, hardware device, other module, or a combination thereof.

Hypervisor 120 may also be known as a virtual machine monitor (VMM) and may provide virtual machines 110A-C with access to one or more features of the underlying hardware devices 130. In the example shown, hypervisor 120 may run directly on the hardware of computer system 100 (e.g., bare metal hypervisor). In other examples, hypervisor 120 may run on or within a host operating system (not shown). Hypervisor 120 may manage system resources, including access to hardware devices 130, and may manage execution of virtual machines 110A-C on a host machine. This includes provisioning resources of a physical central processing unit ("CPU") to each virtual machine 110A-C running on the host machine. Software executing in virtual machines 110A-C may operate with reduced privileges such that hypervisor 120 retains control over resources. Hypervisor 120 retains selective control of the processor resources, physical memory, interrupt management, and input/output ("I/O"). In the example shown, hypervisor 120 may include a container management component 124. The container management component 124 may enable nesting of child virtual machines within container 105A-C running a parent virtual machine by creating nested container in container 105A-C and running the child virtual machine within the nested container. The container management component 124 refers to a software component implemented by one or more software modules, each module associated with a set of executable instructions. Furthermore, the container management component 124 is purely functional, i.e., container management component 124 may be an integral part of the executable code of hypervisor 120.

Container management component 124 may create a nested container within another container to run a child virtual machine, by sending a request to hypervisor 120 from the parent virtual machine ran in one of container 105A-C. To create the nested container, responsive to receiving the request by the hypervisor 120, the hypervisor 120 performs a container application programming interface ("API") call to create a container. The container API refers to software tools utilized to manage container creation and management of resources for the created containers. As a result, of receiving the request, the hypervisor 120 creates a nested container to be nested within the container 105A-C of the requesting parent virtual machine. After creation of the nested container, the child virtual machine is ran within the nested container. Accordingly, each child virtual machine being ran in a nested container imposes little to no overhead because programs within each of the containers may use the underlying hypervisor 120 to execute system calls, as will be discussed in more detail in regards to FIG. 2.

Hardware devices 130 may provide hardware resources and functionality for performing computing tasks. Hardware devices 130 may include one or more physical storage devices 132, one or more physical processing devices 134, other computing devices, or a combination thereof. One or more of hardware devices 130 may be split up into multiple separate devices or consolidated into one or more hardware devices. Some of the hardware device shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices (e.g., random access memory (RAM)), non-volatile memory devices (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 may include one or more processors that are capable of executing the computing tasks. Physical processing devices 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 134 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

Network 140 may be a public network (e.g., the internet), a private network (e.g., a local area network (LAN), a wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
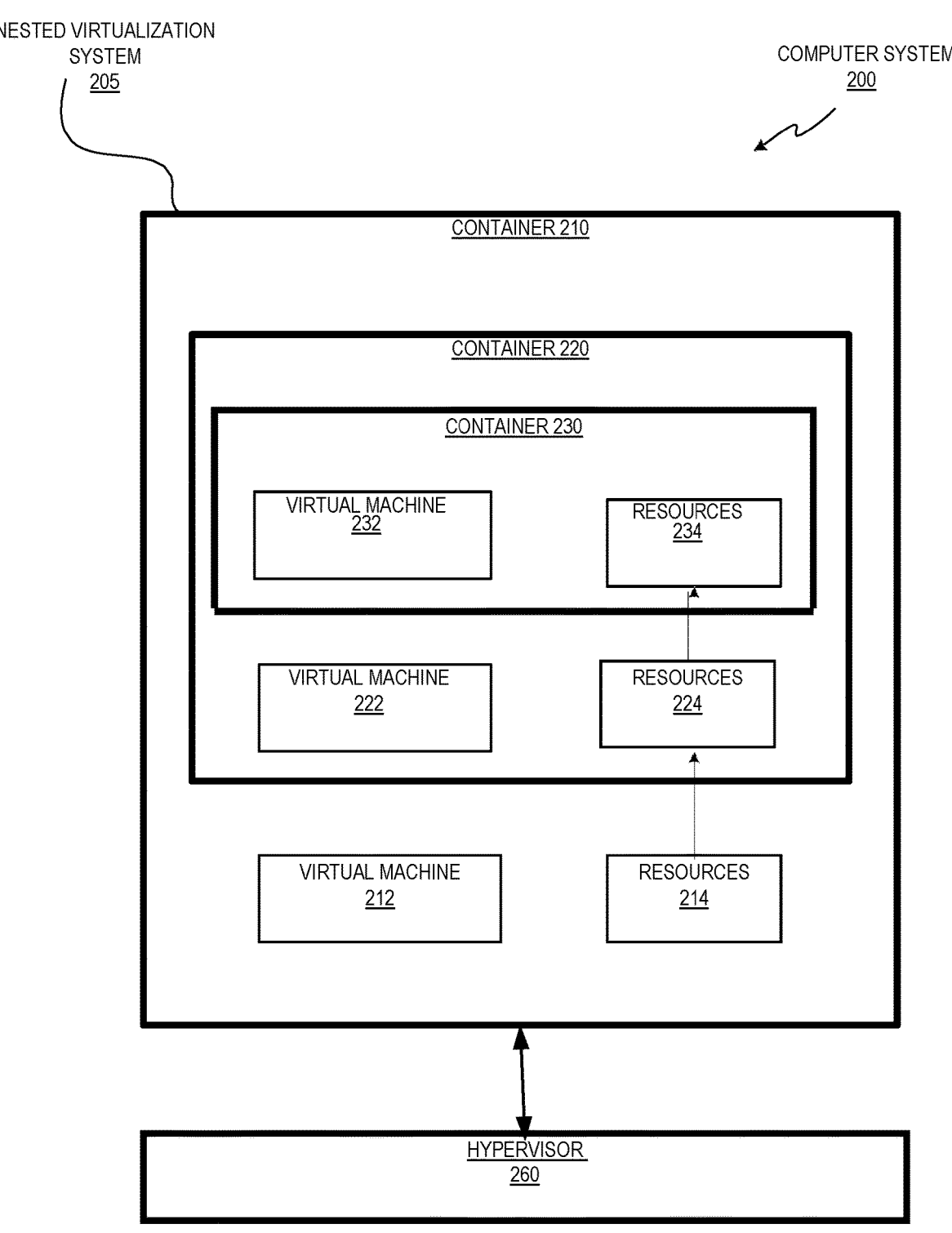
FIG. 2 depicts a block diagram illustrating an example of a virtual machine running in a container, in accordance with one or more aspects of the present disclosure.

FIG. 2 is a block diagram illustrating example components and modules of computer system 200, in accordance with one or more aspects of the present disclosure. Computer system 200 may comprise executable code that implements one or more of the components and modules and may be implemented within a hypervisor, a host operating system, a guest operating system, hardware firmware, or a combination thereof. In the example shown, computer system 200 may include containers 210, 220, and 230, virtual machines 212, 222, and 232, resources 214, 224, and 234, and hypervisor 260.

Nested virtualization system 205 may include a container 210 implemented with resources 214 provided by hypervisor 260. In some instances, all of the resources of the bare metal may be provided to container 210, or a subset of the bare metal resources may be provided to container 210 (e.g., resources 214).

Nested virtualization system 205 may run virtual machine 212 in container 210 with resources 214. Virtual machine 212 may request hypervisor 260 to create a nested virtual machine 222 (e.g., child virtual machine) of virtual machine 212. Hypervisor 260, responsive to the received request, creates container 220 within container 210 and provides, to the newly created nested container 220, resources 224 that include at least a subset of resources 214 of the container 210. In some implementations, resources 224 of container 220 are limited to the resources 214 of container 210. In some instances, all of resources 214 may be provided to resources 224 of container 220, or a subset of resources 214 may be provided to resources 224 of container 220. Depending on the embodiment, virtual machine 212 may send a request to hypervisor 260 to destroy virtual machine 222, in which case, hypervisor 260 receives the request, shuts down virtual machine 222, and destroys container 220.

In some embodiments, virtual machine 222 may send a request to hypervisor 260 to create a guest virtual machine 232 (e.g., child virtual machine) of virtual machine 222 from hypervisor 260. Hypervisor 260, based on the received request, creates container 230 within container 220 and provides, to the newly created nested container 230, resources 234 that include at least a subset of resources 224 of the container 220. Resources 234 of container 230 are thus limited to the resources 224 of container 220. In some instances, all of resources 224 may be provided to resources 234 of container 230, or a subset of resources 224 may be provided to resources 234 of container 230. Depending on the embodiment, virtual machine 212 may send a request to hypervisor 260 to destroy virtual machine 222, in which case, hypervisor 260 receives the request, shuts down virtual machine 222 and virtual machine 230, and destroys containers 220 and 230. Virtual machine 212 may send a request to hypervisor 260 to destroy virtual machine 232, in which case, hypervisor 260 receives the request, shuts down virtual machine 232, and destroys container 230. Virtual machine 222 may send a request to hypervisor 260 to destroy virtual machine 232, in which case, hypervisor 260 receives the request and shuts down virtual machine 232 by destroying containers 230.

FIG. 3 depicts a flow diagram of an illustrative example of a method 300 for creating processing threads for nested virtual machines, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a kernel of a hypervisor as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 300 may be performed by processing devices of a server device or a client device and may begin at block

310. At block 310, a host computer system may run, by a host computer system, a hypervisor managing a first virtual machine implemented by a first container with a first set of resources. The hypervisor may create the first container and enable the first virtual machine to run within the first container. As described previously, the hypervisor provides the first set of resources to the first container to be used by the first virtual machine according to the resources requirements of the first virtual machine.

At block 320, the host computer system may create, by the hypervisor, a second container implementing the second virtual machine, wherein the second container is nested within the first container. As described previously, creating the second virtual machine is performed responsive to receiving a request from the first virtual machine. Once the nested container is created, the hypervisor enables a second virtual machine to run within the second container which is nested in the first container.

At block 330, the host computer system may identify, by the first virtual machine of the first container, a second set of resources comprising one or more of the first set of resources to assign to the second container. In some embodiment, the identified one or more of the first set of resources refers to all of the resources from the first set of resources. In some embodiments, the identified one or more of the first set of resources refers to one or more of the first set of resources identified by the request (e.g., container API call) which determined the type of resources needed by the nested container and the amount of resources needed by the nested container. Based on the type and amount of resources needed by the nested container one or more of the first set of resources may be identified as resources to be assigned to the nested container. As described previously, the hypervisor when creating the second container assigns one or more of the first set of resources to the second container. Prior to assigning one or more of the first set of resources to the second container, the hypervisor receives from the first virtual machine one or more of the first set of resources which determines the resources that the second virtual machine needs to run. The second set of resources is a subset of the first set of resources. To determine the one or more of the first set of resources to be used by the second virtual machine, the first virtual machine of the first container selects one or more of the first set of resources to assign to the second container by limiting the first set of resources to one or more of the first set of resources.

At block 340, the host computer system may assign, by the hypervisor, the second set of resources to the second container. To assign the second set of resources to the second container the first virtual machine sends a request to the hypervisor to assign the one or more of the first set of resources of the first container to the second container (i.e., responsive to receiving the request to assign resources by the hypervisor, the hypervisor performs a container API call to assign the identified one or more of the first set of resources to the second container). The second set of resources are unavailable to the first container. For example, the one or more of the first set of resources that have been assigned to the second container is unable be used by the first container. Accordingly, the first set of resources can only be used by the first container or the second container.

The host computer system may further responsive to shutting down the second virtual machine, destroy, by the hypervisor, the second container. In the event, the second virtual machine is shut down, the one or more of the first set of resources used by the second container is returned to the first container. Accordingly, the one or more of the first set of resources returned to the first container is usable by the first container.

Responsive to completing the operations described herein above with references to block 330, the method may terminate.

FIG. 4 depicts a block diagram of a computer system 400 operating in accordance with one or more aspects of the present disclosure. Computer system 400 may be the same or similar to computing device 100 of FIG. 1 or computing device 200 of FIG. 2, and may include one or more processors and one or more memory devices. In the example shown, computer system 400 may include a virtualization initialization module 410, a container creation module 420, a resource determination module 430, and a resource assignment module 440.

Virtualization initialization module 410 may enable the processing device (e.g., processor) to run a hypervisor managing a first virtual machine implemented by a first container with a first set of resources. The first set of resources used by the first container is provided by the hypervisor to the first container according to the resources requirements of the first virtual machine.

Container creation module 420 may enable the processor to create a second container implementing a second virtual machine. The processor nests the second container within the first container. As described previously, to initiate the container creation module, the first virtual machine sends a request to the hypervisor to create a child virtual machine (e.g., second virtual machine). Based on the request, the container creation module 420 creates a second container to be nested within the first container.

Resource determination module 430 may enable the processor to determine one or more of the first set of resources to assign to the second container. The first container determines which of the one or more of the first set of resources are needed to run the second virtual machine within the second container. For example, the first virtual machine can determine that all of the first set of resources are needed by the second container or a subset of the first set of resources.

Resource assignment module 440 may enable the processor to assign to the second container one or more of the first set of resources. To assign the one or more of the first set of resources to the second container, the first virtual machine sends a request to the hypervisor to assign one or more of the first set of resources of the first container to the second container. As described previously, the first set of resources can only be used by one of the first container or the second container. For example, the one or more of the first set of resources that have been assigned to the second container is unable be used by the first container. Accordingly, the first set of resources can only be used by the first container or the second container.

FIG. 5 depicts a flow diagram of an illustrative example of a method 500 for creating processing threads for nested virtual machines, in accordance with one or more aspects of the present disclosure. Method 500 and each of its individual functions, routines, subroutines, or operations may be performed by one or more processors of the computer device executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processes implementing method 500 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 500 may be performed by a kernel of a hypervisor as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 500 may be performed by processing devices of a server device or a client device and may begin at block 510. At block 510, a host computer system may run, by a host computer system, a hypervisor managing a first virtual machine implemented by a first container with a first set of resources. As described previously, the hypervisor may create the first container and enable the first virtual machine to run within the first container. The hypervisor provides the first set of resources to the first container to be used by the first virtual machine according to the resources requirements of the first virtual machine.

At block 520, the host computer system may run, by the host computer system based on a request from the first virtual machine, a second virtual machine, managed by the first virtual machine, implemented by a second container with a second set of resources, wherein the second set of resources is a subset of the first set of resources. As described previously, the hypervisor may create a nested container (e.g., the second container) within the first container based on a received request from the first virtual machine. Once the nested container is created, the hypervisor, enables a second virtual machine to run within the second container which is nested in the first container. The first virtual machine determines a subset of first set of resources based on limiting the first set of resources according to the resources requirements or the resources the first virtual machine anticipates the second virtual machine would need to run. The second s of resources is unavailable to be used by the first container. For example, the second set of resources that have been assigned to the second container are one or more of the first set of resources and is unable be used by the first container.

The host computer system may further responsive to shutting down the second virtual machine, destroy, by the hypervisor, the second container. In the event, the second virtual machine is shut down, the second set of resources comprising one or more of the first set of resources used by the second container is returned to the first container. Accordingly, the one or more of the first set of resources returned to the first container is available to be used by the first container.

Responsive to completing the operations described herein above with references to block 520, the method may terminate.

FIG. 6 depicts a block diagram of a computer system operating in accordance with one or more aspects of the present disclosure. In various illustrative examples, computer system 600 may correspond to computing device 100 of FIG. 1 and computing device 200 of FIG. 200. Computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing method 300 or 500 and for encoding components implemented on FIG. 1 and FIG. 6.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 or 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:

running, by a host computer system, a hypervisor that executes a first container with a first set of resources, and wherein the first container executes a first virtual machine;

creating, by the hypervisor, a second container executing a second virtual machine, wherein the second container is nested within the first container and the second virtual machine is a child virtual machine of the first virtual machine;

identifying, by the first virtual machine of the first container, a second set of resources to be allocated to the second container, wherein the second set of resources is a subset of the first set of resources; and assigning, by the hypervisor, the second set of resources to the second container.

2. The method of claim 1, wherein the first set of resources comprises one or more resources of the host computer system.

3. The method of claim 1, wherein the second set of resources is unavailable to the first container.

4. The method of claim 1, wherein creating the second virtual machine is performed responsive to receiving a request from the first virtual machine.

5. The method of claim 1, further comprising: responsive to shutting down the second virtual machine, destroying, by the hypervisor, the second container.

6. The method of claim 5, wherein responsive to shutting down the second virtual machine, the second set of resources used by the second container is available to the first container.

7. A system comprising:

a memory device;

a processing device operatively coupled to the memory device, to perform operations comprising:

running, by a host computer system, a hypervisor that executes a first container with a first set of resources, and wherein the first container executes a first virtual machine;

creating, by the hypervisor, a second container executing a second virtual machine, wherein the second container is nested within the first container and the second virtual machine is a child virtual machine of the first virtual machine;

identifying, by the first virtual machine of the first container, a second set of resources to be allocated to the second container, wherein the second set of resources is a subset of the first set of resources; and assigning, by the hypervisor, the second set of resources to the second container.

8. The system of claim 7, wherein the first set of resources comprises one or more resources of the host computer system.

9. The system of claim 7, wherein the second set of resources is unavailable to be used by the first container.

10. The system of claim 7, wherein creating the second virtual machine is performed responsive to receiving a request from the first virtual machine.

11. The system of claim 7, wherein the operations further comprise: responsive to shutting down the second virtual machine, destroying, by the hypervisor, the second container.

12. The system of claim 11, wherein responsive to shutting down the second virtual machine, the second set of resources used by the second container is available to be used by the first container.

13. A non-transitory machine-readable storage medium including instructions that, when accessed by a processing device, cause the processing device to:

run, by a host computer system, a hypervisor that executes a first container with a first set of resources, and wherein the first container executes a first virtual machine; and run, by the host computer system based on a request from the first virtual machine, a second virtual machine that executes within a second container using a second set of resources identified as resources to be allocated to the second container, wherein the first virtual machine of the first container identifies the second set of resources that is a subset of the first set of resources and wherein the second virtual machine is a child virtual machine of the first virtual machine.

14. The non-transitory machine-readable storage medium according to claim 13, wherein the subset of the first set of resources is determined by limiting the first set of resources to one or more resources of the first set of resources.

15. The non-transitory machine-readable storage medium according to claim 13, wherein the first set of resources comprises resources of the host computer system dedicated only to the first container or the second container.

16. The non-transitory machine-readable storage medium according to claim 13, wherein the second set of resources is unavailable to be used by the first container.

17. The non-transitory machine-readable storage medium according to claim 13, wherein the processing device is further caused to: responsive to shutting down the second virtual machine, destroy, by the hypervisor, the second container.

18. The non-transitory machine-readable storage medium according to claim 17, wherein responsive to shutting down the second virtual machine, the subset of the first set of resources used by the second container is available to be used by the first container.

* * * * *